United States Patent
Horton et al.

(10) Patent No.: US 12,293,396 B2
(45) Date of Patent: May 6, 2025

(54) METHOD, APPARATUS AND COMPUTER PROGRAM PRODUCT FOR SELECTING A KIT OF PARTS THAT TRAVERSE AN INCLINE

(71) Applicant: ISLAND MOBILITY LTD, Isle of Wight (GB)

(72) Inventors: Robert Horton, Newport (GB); Lee Prior, Southsea (GB); Nathan Gaskin, Southsea (GB)

(73) Assignee: ISLAND MOBILITY LTD, Island of Wight (GB)

( * ) Notice: Subject to any disclaimer, the term of this patent is extended or adjusted under 35 U.S.C. 154(b) by 0 days.

(21) Appl. No.: 17/783,821

(22) PCT Filed: Dec. 11, 2020

(86) PCT No.: PCT/GB2020/053188
§ 371 (c)(1),
(2) Date: Jun. 9, 2022

(87) PCT Pub. No.: WO2021/144549
PCT Pub. Date: Jul. 22, 2021

(65) Prior Publication Data
US 2023/0039940 A1 Feb. 9, 2023

(30) Foreign Application Priority Data

Jan. 16, 2020 (GB) .................................. 2000677
May 5, 2020 (GB) .................................. 2006601

(51) Int. Cl.
*G06Q 30/06* (2023.01)
*B66B 9/08* (2006.01)
(Continued)

(52) U.S. Cl.
CPC .......... *G06Q 30/0627* (2013.01); *B66B 9/08* (2013.01); *G06Q 30/0633* (2013.01); *G06T 19/006* (2013.01)

(58) Field of Classification Search
CPC .......................... G06Q 30/06; G06Q 30/0627
See application file for complete search history.

(56) References Cited

U.S. PATENT DOCUMENTS

2017/0243365 A1* 8/2017 Nuijten ................. B66B 9/0846
2020/0242284 A1* 7/2020 Schierenbeck ......... B66B 19/00

FOREIGN PATENT DOCUMENTS

DE 102013224373 A1 * 6/2014 ............ G01B 11/24
EP 3024770 B1 12/2017
(Continued)

OTHER PUBLICATIONS

"Stair Lifts—Stair Lift Measuring Guide." Web.archive.org, Mar. 28, 2016, https://web.archive.org/web/20160328094414/https://www.usmedicalsupplies.com/How-To-Measure.htm.*
(Continued)

*Primary Examiner* — Jeffrey A. Smith
*Assistant Examiner* — Jennifer V Lee
(74) *Attorney, Agent, or Firm* — Thomas | Horstemeyer, LLP

(57) ABSTRACT

A method of selecting a plurality of components as a kit of parts that traverse an incline, the method comprising: acquiring measurement information indicative of one or more physical dimensions of the incline S1202; generating a model of the incline in accordance with the measurement information S1204; confirming the model by overlaying the model upon the incline S1206; and selecting, on the basis of the model, a plurality of components, from a predetermined set of components, as a kit of parts for traversing the incline S1208.

17 Claims, 11 Drawing Sheets

(51) Int. Cl.
*G06Q 30/0601* (2023.01)
*G06T 19/00* (2011.01)

(56) References Cited

FOREIGN PATENT DOCUMENTS

JP        H08136254 A  *  11/1994
WO     2018193034 A1    10/2018

OTHER PUBLICATIONS

"Prodim Stairs Software." Prodim, Nov. 9, 2018, web.archive.org/web/20181109060858/www.prodim-systems.com/products/stairs/.*
International Search Report and Written Opinion of PCT/GB2020/053188, mailed Mar. 16, 2021.

* cited by examiner

METHOD, APPARATUS AND COMPUTER PROGRAM PRODUCT FOR SELECTING A KIT OF PARTS THAT TRAVERSE AN INCLINE

CROSS REFERENCE TO RELATED APPLICATIONS

This application is the 35 U.S.C. § 371 national stage application of PCT Application No. PCT/GB2020/053188, filed Dec. 11, 2020, which application claims the benefit of Great Britain Application No. GB 2000677.1, filed Jan. 16, 2020, and Great Britain Application No. GB 2006601.5, filed May 5, 2020, all of which are hereby incorporated by reference herein in their entireties.

BACKGROUND

Field of the Disclosure

The present invention relates to a method, apparatus and computer program product for selecting a plurality of stairlift components as a kit of parts that traverse an incline.

Description of the Related Art

The "background" description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present invention.

Stairlifts in homes comprise a rail which is secured to the stair tread on the left or right side of the staircase in order to assist a person with mobility difficulties to move up and/or down the staircase. That is, these stairlifts, in homes, comprise a rail which is itself installed on the tread of a staircase and a motorised chair which climbs up and down the rail. The person with mobility difficulties sits on the motorised chair and is then assisted in moving up and/or down the staircase.

Stairlifts typically have their rail custom made to fit a particular physical dimension of the staircase in a house. The rail is then unable to be used in other houses with different dimensions of staircase. This makes the stairlift expensive to install and unsaleable to another user or customer when the stairlift is no longer required in the original house.

It is possible for stairlifts to have rails which are assembled from a plurality of individual stairlift components. That is, the rail of these staircases is made up of individual components which are assembled in situ in order to form a stairlift rail which fits the specific staircase. This allows the components of the stairlift, including the stairlift rail, to be reused when the stairlift is no longer required at the original house.

However, staircases are often unique and vary considerably between houses. That is, many houses have bespoke staircases which have been designed specifically for that house. In fact, even amongst staircases which appear similar in design, there may be significant variations amongst the physical dimensions of the staircases.

Moreover, stairlift rails are complex and must be carefully constructed in order to ensure safe and smooth operation of the stairlift device.

Accordingly, it can be challenging to assemble a stairlift for installation on a staircase using a plurality of standard stairlift components, leading to significant installation delays and thus increasing the cost of the stairlift.

Similar considerations apply to any situation where components are selected to traverse any incline, such as a staircase or slope (either indoors or outdoors).

It is an aim of the present disclosure to address these issues.

SUMMARY

A brief summary about the present disclosure is provided hereinafter to provide basic understanding related to certain aspects of the present disclosure.

Embodiments of the present disclosure are provided in the appended claims.

According to aspects of the disclosure, a plurality of components can be selected as a kit of parts for traversing an incline, resulting in a reduction in the both time and expense required to design and install a stairlift or ramp or the like that traverses the incline using a predetermined set of components.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
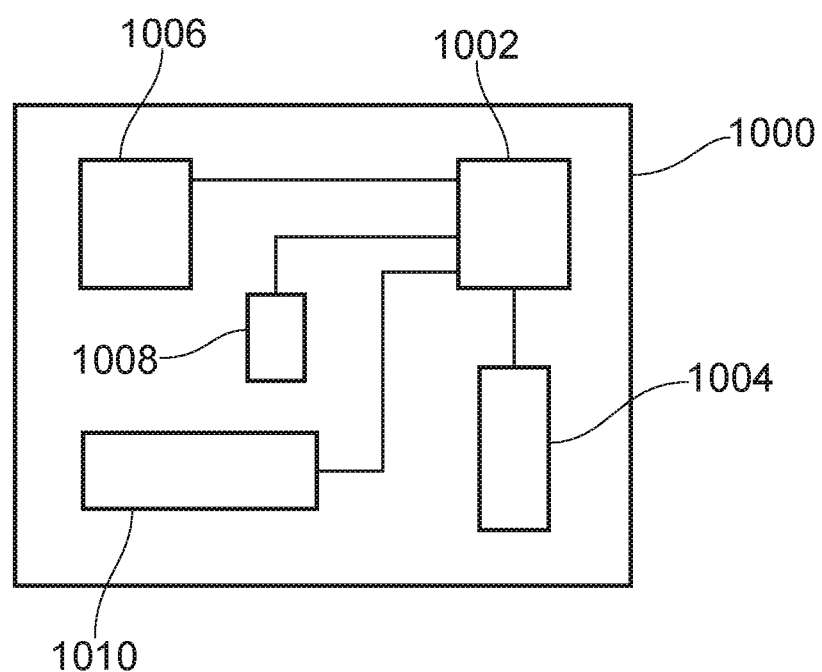
FIG. 1 illustrates an apparatus in accordance with embodiments of the disclosure.

Referring now to the drawings, wherein like reference numerals designate identical or corresponding parts throughout the several views.

Referring to FIG. 1, an apparatus 1000 according to embodiments of the disclosure is shown. Typically, an apparatus 1000 according to embodiments of the disclosure is a computer device such as a personal computer or a terminal connected to a server. Indeed, in embodiments, the apparatus may also be a server. The apparatus 1000 is controlled using a microprocessor or other processing circuitry 1002. In some examples, the apparatus 1000 may be a portable computing device such as a mobile phone, laptop computer or tablet computing device.

The processing circuitry 1002 may be a microprocessor carrying out computer instructions or may be an Application Specific Integrated Circuit. The computer instructions are stored on storage medium 1004 which maybe a magnetically readable medium, optically readable medium or solid state type circuitry. The storage medium 1004 may be integrated into the apparatus 1000 or may be separate to the apparatus 1000 and connected thereto using either a wired or wireless connection. The computer instructions may be embodied as computer software that contains computer readable code which, when loaded onto the processor circuitry 1002, configures the processor circuitry 1002 to perform a method according to embodiments of the disclosure.

Additionally, an optional user input device 1006 is shown connected to the processing circuitry 1002. The user input device 1006 may be a touch screen or may be a mouse or stylist type input device. The user input device 1006 may also be a keyboard or any combination of these devices.

A network connection 1008 may optionally be coupled to the processor circuitry 1002. The network connection 1008 may be a connection to a Local Area Network or a Wide Area Network such as the Internet or a Virtual Private Network or the like. The network connection 1008 may be connected to a server allowing the processor circuitry 1002 to communicate with another apparatus in order to obtain or provide relevant data. The network connection 1002 may be behind a firewall or some other form of network security.

Additionally, shown coupled to the processing circuitry 1002, is a display device 1010. The display device 1010, although shown integrated into the apparatus 1000, may additionally be separate to the apparatus 1000 and may be a monitor or some kind of device allowing the user to visualise the operation of the system. In addition, the display device 1010 may be a printer, projector or some other device allowing relevant information generated by the apparatus 1000 to be viewed by the user or by a third party.

Figure 2:
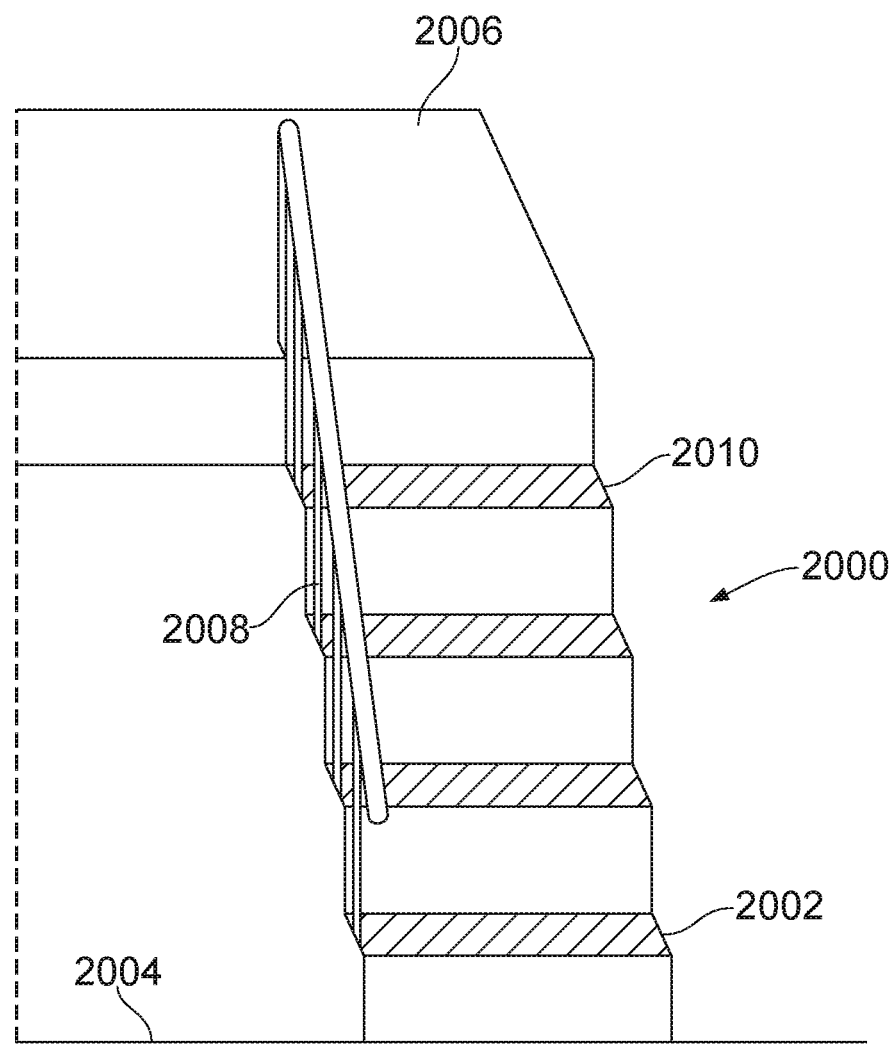
FIG. 2 illustrates an example situation to which embodiments of the disclosure may be applied.

Referring to FIG. 2, an example situation to which embodiments of the disclosure may be applied is illustrated. In this example situation, a staircase 2000 is illustrated. However, it should be noted that the disclosure is not so limited and any type of inclined surface is envisaged. For example, embodiments of the disclosure are applicable to a slope outside which may or may not be stepped. In this regard, the kit of parts may be for a ramp or the like that traverses stairs, or more generally the inclined surface. This will be explained later.

Returning back to FIG. 2, this staircase 2000, for example, is comprised of a number of individual steps, such as step 2002. These steps are arranged in order to form the staircase 2000 extending from a first platform 2004 (such as a floor or level) to a second platform 2006 (such as a second floor or level). In examples, the second platform 2006 may be a landing, such as that found on the first (or second) floor of a house. A bannister, or safety railing, 2008 is also provided on the staircase in order to prevent a person from falling off the staircase 2000 as they are walking up (or down) the staircase 2000. It should be noted that the first platform 2004 and/or the second platform 2006 in the more general example, may be any kind of substantially flat surface. For example, the first platform 2004 and/or the second platform 2006 may be a piece of ground, or may be an installed platform as will be explained later.

Figure 3:
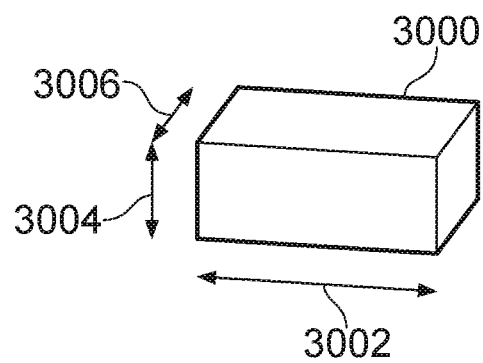
FIG. 3 illustrates an enlarged view of the example situation of FIG. 2 of the present disclosure.

Referring to FIG. 3, an enlarged view of the example staircase situation of FIG. 2 is shown in more detail. That is, an enlarged illustration of a single step 3000 of the staircase 2000 is shown. This step 3000 may be step 2002, or may be any of the other individual steps which the staircase 2000 is constructed or assembled from. A number of physical dimensions of the step are illustrated in FIG. 2. That is, the individual step 3000 can be defined by a width 3002, a height 3004 and a depth 3006. The actual values of these physical dimensions will vary in accordance with the type of the staircase and the environment within which the staircase is assembled.

Furthermore, it will be appreciated that there may be some variation between the physical dimensions of the individual steps which form the staircase 2000. That is, a first step (such as the bottom step 2002) may have a first set of physical dimensions, while a second step of the staircase (such as the step 2010) may have a second set of physical dimensions (the second set of physical dimensions being different from the first set of physical dimensions in one or more dimension). This variation between the physical dimensions of the individual steps may occur owing to certain tolerance ranges when constructing the staircase 2000, or may, alternatively, occur owing to the design of the staircase. A staircase with a turn (such as a quarter-turn staircase) may require a variation of the physical dimensions of the steps which form the turn (such as the provision of an intermediate landing or angled steps) when compared to the steps which form a straight portion of the staircase.

The physical dimension of the staircase 2000 may therefore, in certain examples, be defined by the physical dimensions of the individual component steps, the number of steps and the relative orientation of those individual steps.

In this example situation, it is desired that a stairlift is provided on the staircase 2000. That is, it is desired that a stairlift is installed on the staircase in order to assist a person with mobility difficulties to move up or down the staircase 2000.

Now, as described above, rather than creating a bespoke stairlift rail for each individual staircase, it is possible that stairlifts are assembled from a number of individual set components, with those components being reusable for installation in other staircases once they are no longer required in the original staircase. This reduces the costs associated with the installation of a stairlift.

However, owing to the potential variations in the physical dimensions of the staircase, it can be difficult to fit a stairlift to a staircase, using a plurality of set stairlift components, leading to significant installation delays. That is, when it is requested that a stairlift is installed on a staircase, the installer of the stairlift may need to take an unrealistically large range and number of surplus stairlift components to the house comprising the staircase, such that these components can be arranged in various configurations on the staircase until a stairlift rail which fits the staircase can be constructed from at least a portion of those original stairlift components.

This increases the time and cost associated with the installation of a stairlift on a staircase.

Accordingly, a method, apparatus and computer program product for selecting a plurality of stairlift components as a kit of parts for a stairlift rail is provided in accordance with embodiments of the present disclosure.

In addition, the mechanism for surveying the staircase or incline is described. In particular, an apparatus and associated method and computer program for displaying a plurality of components that traverse an incline is described. This apparatus comprising processing circuitry that is configured to acquire measurement information indicative of one or more physical dimensions of the incline; generate a model of the incline in accordance with the measurement information; confirm the model by overlaying the model upon the incline; and display, on the basis of the model, a plurality of components, that traverse the incline.

This arrangement allows a survey of the incline to be taken and for the survey to be carried out quickly and accurately. Moreover, by displaying the plurality of components on the basis of the model, a visual confirmation that the incline will be traversed can be achieved.

Embodiments of the disclosure will be described with reference to this example situation (as illustrated with reference to FIG. 2 of the present disclosure).

Acquiring Measurement Information:

As described above, in the example situation described with reference to FIG. 2 of the present disclosure, a person (such as a homeowner) wants a stairlift to be installed on the staircase 2000. In accordance with embodiments of the disclosure, this person may operate an apparatus (such as apparatus 1000) in order to select a kit of parts for the stairlift.

Initially, according to embodiments of the disclosure, apparatus 1000 is configured to acquire information regarding a number of physical dimensions of the staircase to which the stairlift is to be installed. The physical dimensions of the staircase may be determined in accordance with certain measurements which have been performed on the staircase.

In examples, these measurements are made prior to the dispatch or shipment of the stairlift components to the staircase (that is, to the home or other location where the staircase to which the stairlift is to be installed is located).

In some examples, these measurements may be performed by an individual, such as the person who wishes to purchase the stairlift. In other examples, the measurements may be performed by a skilled surveyor, such as the person who will later install the stairlift. In this case, the measurements of the staircase may be acquired on an initial visit to the staircase. As such, because this initial survey is for the purpose of acquiring the measurements of the staircase, an unrealistically large set of components of the staircase need not be taken to the location by the surveyor.

Figure 4:
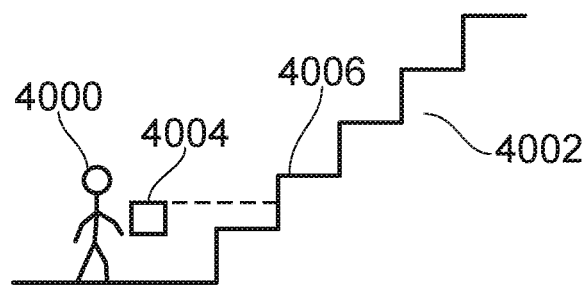
FIG. 4 illustrates an example of acquiring measurement data in accordance with embodiments of the disclosure.

FIG. 4 illustrates an example of acquiring measurement data in accordance with embodiments of the disclosure. In this example, a person 4000 is performing a measurement of one or more physical dimensions of a staircase 4002 (which may be the staircase 2000 illustrated with reference to FIG. 2 of the present disclosure). The person 4000 performs the measurement of the physical dimensions of the staircase 4002 using a measurement device 4004. This measurement device acquires measurements of the physical dimensions of the staircase 4002 including measurements of the individual steps of the staircase (such as step 4006). Once the measurements have been performed by the person 4000 using the measurement device 4004, measurement information indicative of the one or more physical dimensions of the staircase 4002 may be sent to apparatus 1000.

The measurement device used to perform the measurements of the physical dimensions of the staircase by the person 4000 is not particularly limited in accordance with embodiments of the disclosure.

In some examples, the measurement device which performs the measurement of the physical dimensions of the staircase may be a laser measurement device. In this case, the person 4000 proceeds to measure the physical dimensions of the steps of the staircase (such as the height, width and depth of the steps). Alternatively, the measurement device may be a camera or camera system which is configured in order to determine physical dimensions of an object (such as the staircase, or individual steps of the staircase) from live or recorded images of the scene. In this case, the person 4000 proceeds to capture a number of images of the staircase in order that the physical dimensions of the staircase may be determined. In some examples, a number of temporary markers may be placed on the staircase in order to assist the measurement device in determining the physical dimensions of the staircase from the captured images.

The apparatus 1000 may prompt the person 4000 to perform the measurements (such as an instruction as to the sequence of measurements which are to be performed). Alternatively, the measurements may be made in any order and recorded against a unique identifier identifying the specific measurement which has been made. Alternatively, the measurements may be performed in a predetermined sequence.

In an example, a predetermined sequence may comprise the user first providing the height of the bottom (lowest) step of the staircase. Then, the user may be required to provide the width of this bottom step. Finally, the user may be required to provide the depth of this bottom step. Once these measurements of the first step have been provided, the sequence may proceed to the measurements of height, width and depth of the next step of the staircase (being the step which is adjoined to the bottom step).

Alternatively, in examples, the predetermined sequence may comprise first specifying the number of the steps of the staircase, before subsequently specifying the dimensions of a first step of that staircase (again, the dimensions could comprise the height, width and depth of a first step of the staircase). These dimensions, of the first step, could then be applied to each subsequent step of the staircase (up to the maximum number of steps which has been specified). This reduces the amount of user input which is required.

The measurement information may be acquired by the apparatus 1000 as each measurement is performed or, alternatively, may be acquired only when the measurements (or a subset of those measurements) have been completed.

In some examples, the measurement device 4000 may be integral to the apparatus 1000. In other examples, the measurement device may be external to apparatus 1000. In this case, the measurement device will be communicatively coupled to the apparatus 1000 such that apparatus 1000 receives the measurement information indicative of the one or more physical dimensions of the staircase by any wired or wireless communication in the measurement device. Alternatively, in other examples, the person 4000 may provide the measurement information to the apparatus 1000 using an input device such as user input device 1006 as described with reference to FIG. 1 of the present disclosure, on the basis of the measurements which have been performed using the measurement device 4000.

Figure 5:
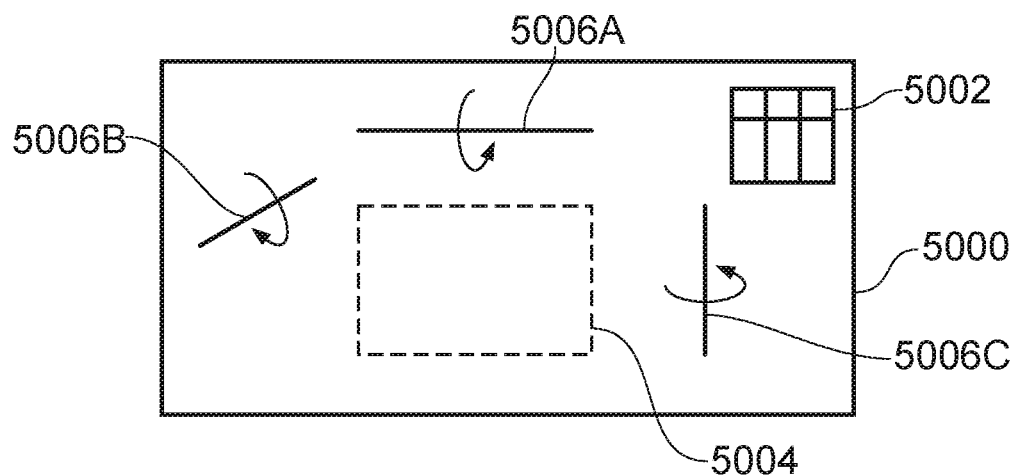
FIG. 5 illustrates a user input screen or graphical user interface which may be displayed to a user in accordance with embodiments of the disclosure.

FIG. 5 illustrates a user input screen or graphical user interface which may be displayed to the person 4000 in order to enter measurement information regarding the physical dimensions of the staircase into apparatus 1000. This may be displayed on a display device such as 1010 as described with reference to FIG. 1 of the present disclosure.

In the example of FIG. 5, the display of the apparatus 1000 is a touch panel display screen 5000. In this example, the person 4000 (herein described as a user of apparatus 1000) may perform interactions with the touch panel display screen 5000 in order that the apparatus 1000 may acquire the measurement information indicative of the physical dimensions of the staircase.

A text entry field 5002 may be provided which enables the user to manually enter the physical dimensions of the staircase which has been measured. The user may use this text entry field in order to indicate the type of staircase (straight, spiral or quarter turn, for example) and/or the number of steps within that staircase. Furthermore, the user may enter the physical dimensions of the steps of the staircase in this text entry field 5002 (such as the height, width or depth of a step of the staircase).

Furthermore, the user may perform interactions with a digital representation of the staircase (or individual steps on that staircase) 5004 in order to modify the physical dimensions of that staircase. Such interactions could comprise a dragging operation performed on a specific portion (such as a corner) of the digitally represented step.

Alternatively, the user may perform additional interactions with the display (illustrated by arrows 5006A to 5006C) in order to manipulate the digital representation of the staircase 5004 displayed on the touch panel display device 1010. In this manner, the user may rotate the digital representation of the staircase 5004 in three-dimensions.

Figure 6:
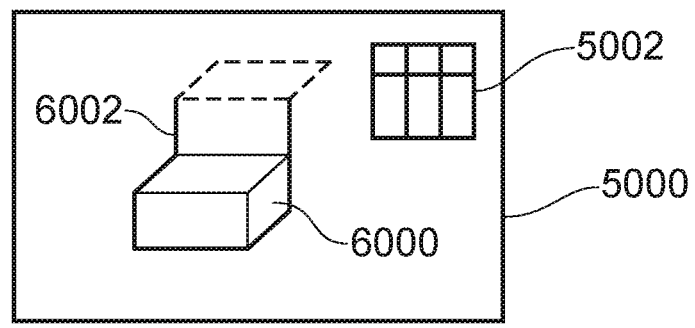
FIG. 6 illustrates an example of generating a model in accordance with embodiments of the disclosure.

Once the measurements for a first step have been entered, the user may press a button on the apparatus 1000 (or, alternatively, an element on the touch panel display screen) in order to proceed to the next stage of measurements (such as the measurements for the subsequent steps in the staircase). This is illustrated with reference to FIG. 6 of the present disclosure. That is, FIG. 6 illustrates an example of the acquisition of measurement data in accordance with embodiments of the disclosure.

Here, measurements for a first step 6000 of a staircase have been input by the user, and the user is subsequently entering the measurements for a second step 6002 of the staircase 2000.

Furthermore, once measurements for the staircase have been completed, the user may confirm that all the measurement information has been provided.

In the manner described with reference to FIGS. 4, 5 and 6 of the present disclosure, the apparatus 1000 acquires measurement information indicative of one or more physical dimensions of a staircase.

Generating a Model of the Staircase:

When the measurement information indicative of the physical dimensions of the staircase has been received, the apparatus 1000 is configured to generate a model of the staircase in accordance with the measurement information.

It will be appreciated that the method of generating the model of the staircase used by apparatus 1000 is not particularly limited. For example, apparatus 1000 may be configured to take the measurement information (which is indicative of the physical dimensions of the staircase) and generate a virtual three-dimensional model of that staircase using polygonal modelling. That is, the physical dimensions of the staircase could be used to construct a three-dimensional representation of the staircase which can thus be manipulated by the user. Dedicated modelling software available in the art may be used to construct the model of the staircase from the measurement information as required.

The three-dimensional model may be generated as a collection of points in three-dimensional space connected by entities such as lines or curves. In some examples, a solid three-dimensional model may be generated by the apparatus 1000. However, a shell or boundary model representing only the surface of the staircase may, alternatively, be generated by apparatus 1000 in accordance with embodiments of the disclosure.

In some examples, the three-dimensional model of the staircase may be generated by manipulation of the properties of a series of pre-constructed models of a staircase in accordance with the measurement information which has been received. In this manner, a pre-constructed model of the staircase may be adapted in accordance with the measurement information which has been obtained. This reduces the processing demands required to construct or generate the model of the staircase in accordance with embodiments of the disclosure.

It will be appreciated that in some situations (whereby the user inputs the measurement information to the apparatus 1000 using a graphical user interface as illustrated with reference to FIGS. 4, 5 and 6 of the present disclosure) the model of the staircase may be generated by the apparatus 1000 simultaneously with the acquisition of the measurement information.

It will further be appreciated that the present disclosure is not particularly limited to a three-dimensional model of the staircase, but may also be a two dimensional model of the staircase.

Moreover, the number of models generated by the apparatus 1000 is not limited to a single model as described above, but may comprise a plurality of individual models (such as a series or collection of models which can be individually manipulated). For example, a series of two dimensional models may be generated of the staircase, each of these providing a different perspective of the staircase.

The model which has been generated by the apparatus 1000 may be displayed to the user on the display device such as the display device 1010 of apparatus 1000. Alternatively, the model may be generated and internally stored or manipulated by apparatus 1000 in accordance with embodiments of the disclosure without being displayed to the user.

Verification of the Model of the Staircase

Once the model of the staircase has been generated, the apparatus 1000 is configured to perform a confirmation, or verification, of the model which has been generated. This ensures that the model is an accurate representation of the staircase.

Figure 7:
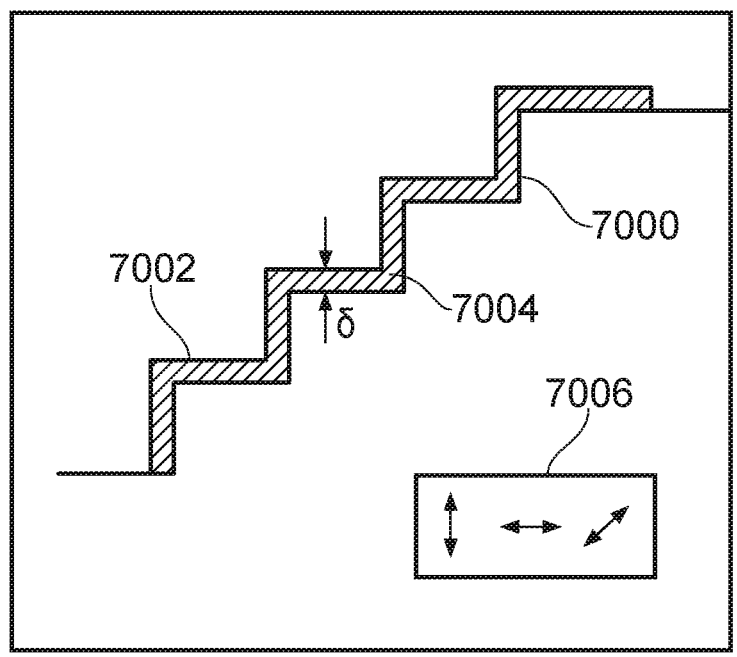
FIG. 7 illustrates an example of confirmation of the model which has been generated in accordance with embodiments of the disclosure.

FIG. 7 illustrates an example confirmation of the model of the staircase which has been generated in accordance with the measurement information. This example shows a side on view (or profile) image 7000 of the staircase 2000. The image of the staircase may have been previously captured by apparatus 1000 (such as when performing the measurement of the staircase) or may, alternatively, be captured by apparatus 1000 for the purpose of performing the verification as and when that image is required.

In other words, in examples the apparatus 1000 may request that the user captures one or more additional pictures of the staircase from one or more locations around the staircase for use in the verification and confirmation of the model which has been generated by the apparatus 1000.

In this example (illustrated in FIG. 7 of the present disclosure) the model 7002 which has been generated by apparatus 1000 is overlaid upon the image 7000 of the staircase 2000. This enables the apparatus 1000 to verify (or confirm) whether the model 7002 which has been generated provides an accurate representation of the staircase 2000. In other words, the apparatus can authenticate that the measurements which have been made of the staircase (indicated by the measurement information which has been received) provide an accurate measurement of the physical dimensions of the staircase.

In this example, the model 7002 of the staircase is graphically overlaid on the captured image of the staircase 7000. However, it will be appreciated that, alternatively, the comparison between the model 7002 and the staircase may be performed by the apparatus 1000 internally without display on the display screen 1010. Moreover, in some examples, an additional comparison between the model 7002 and the image of the staircase may be performed by the user.

In examples wherein the confirmation is performed by a user, augmented reality glasses or virtual reality glasses could be used in order to perform the overlay. Alternatively, in examples, the overlay could be performed on an augmented reality projection system communicatively coupled to apparatus 1000. In these situations, augmented reality provides a means for overlaying a virtual model of the staircase onto the real world (or an image of the real world). That is, a composite view of the model of the staircase and the real world may be provided to the user. This enables the user to interact with model by performing an action in the real world (such as moving around the staircase to change their perspective of the model of the staircase). The method of performing this augmented reality is not particularly limited, and any suitable software and/or hardware may be used to perform the augmentation as required.

Now, in this example, once the overlay has been performed, apparatus 1000 is configured to determine the amount of offset between the model of the staircase and the image of the staircase. The offset amount forms an offset region 7004 as illustrated in FIG. 7. This may be determined by the apparatus through calculation of the residuals between the model 7002 and the image of the actual staircase 7000 at a number of discrete points across the staircase.

When it is determined that the offset a of the model from the staircase is less than a certain predetermined threshold amount, apparatus 1000 will confirm that the model provides an accurate representation of the actual staircase which has been measured. However, if the offset a of the model from the staircase is greater than the predetermined threshold amount, apparatus 1000 will take steps in order to fine-tune the model which has been generated such that it provides an accurate representation of the staircase.

In this manner, apparatus 1000 is configured to verify, or confirm, the model of the staircase which has been generated. There are a number of reasons why the model of the staircase which has been generated may vary from the confirmation image of the staircase. In some situations, the user may have made an error when performing the measurement of the physical dimensions of the staircase. Alternatively, the user may have made an error when providing the physical dimensions of the staircase which have been generated to the apparatus 1000. Alternatively, the user may have used an uncalibrated measuring device when obtaining the physical dimensions of the staircase, for example.

The verification images of the staircase therefore provide a mechanism by which apparatus 1000 can ascertain whether or not the model which has been generated provides an accurate representation of the staircase (that is, whether the model accurately fits the one or more confirmation images of the staircase). Identification of discrepancies between the model which has been generated and the physical staircase, owing to user error for example, further improves the accuracy and reliability of apparatus 1000 when generating a kit of parts for a stairlift rail, and reduces instances of selection of a kit of parts which are not optimal for the staircase of the user.

In examples, the predetermined threshold amount could be set in accordance with certain tolerances of the stairlift. However, it will be appreciated that the absolute value of the predetermined threshold is not particularly limited and will vary in accordance with the situation to which the embodiments of the disclosure are applied.

In examples, fine-tuning of the model may comprise apparatus 1000 adjusting one or more parameters of the model (such as the height of a step) in order that the model more accurately fits the one or more captured verification images of the staircase (that is, in order to reduce the offset amount a). That is, in some situations, apparatus 1000 may be configured to randomly fluctuate one or more parameters of the model in order to determine whether a more optimal fit between the model and the staircase can be achieved. Alternatively, in some examples, apparatus 1000 may be configured to perform object-recognition processing on the staircase, in order to determine which parts of the staircase (such as a certain step of the staircase, or a portion of that step (such as the top edge of the step)) are not accurately represented by the model. In this case, apparatus 1000 could then selectively adapt the associated parameters of the model in order to achieve an improved fit to the staircase (by adapting only the parameters which impact upon the portion of the model which has been found to deviate from the verification images of the staircase).

In this manner, apparatus 1000 is configured to explore the parameter space for the model of the staircase in order to achieve an improved fit between the model of the staircase and the actual staircase (represented by the captured verification images).

Alternatively, fine-tuning the model may require the user to adjust one or more parameters of the model using an onscreen element 7006. Alternatively, the user may be requested to repeat certain measurements of the staircase such that a more accurate value of the physical dimensions of the staircase can be obtained.

Once the model has been adapted (or fine-tuned) in this manner, verification (or confirmation) processing could again be performed in order to determine whether to confirm the adapted model (or whether to perform further adaptation of that model). Similar to the original confirmation, this further confirmation (of the adapted or fine-tuned model) could comprise an automatic calculation by apparatus 1000 of the residuals between the adapted model and the image of the staircase. Then, if these residuals are below a predetermined threshold amount, the model will be confirmed. Alternatively or in addition, such confirmation could comprise the user visually inspecting the overlay of the model and the staircase in order to determine whether the model provides an accurate fit to the staircase (or the image of the staircase). If the user considers that the adapted (or fine-tuned) model provides an accurate fit, the user could press a button on the apparatus 1000 in order to provide confirmation of the model (that is, confirmation that the model provides an accurate fit to, or representation of, the staircase).

In the event that the fine-tuned model is not confirmed following the confirmation processing, further fine-tuning of the model may be performed. This model (which has been further adapted) could then undergo further confirmation processing as required, until an accurate fit to the staircase is obtained.

By confirming the model in this manner, apparatus 1000 can verify that the model provides an accurate representation of the staircase for which the user wants a stairlift to be installed.

Of course, although the foregoing describes a staircase, the disclosure is not so limited and any incline is envisaged. Indeed, displaying, on the basis of the model, a plurality of components, that traverse the incline, the survey can be conducted more efficiently and more quickly.

Kit of Parts:

Once the model has been verified, the apparatus 1000 is configured to use the model to select a kit of parts for the stairlift. These parts are selected from a standard set of available stairlift rail components and represent the parts which will be required in order to construct a stairlift for the staircase.

Figure 8:
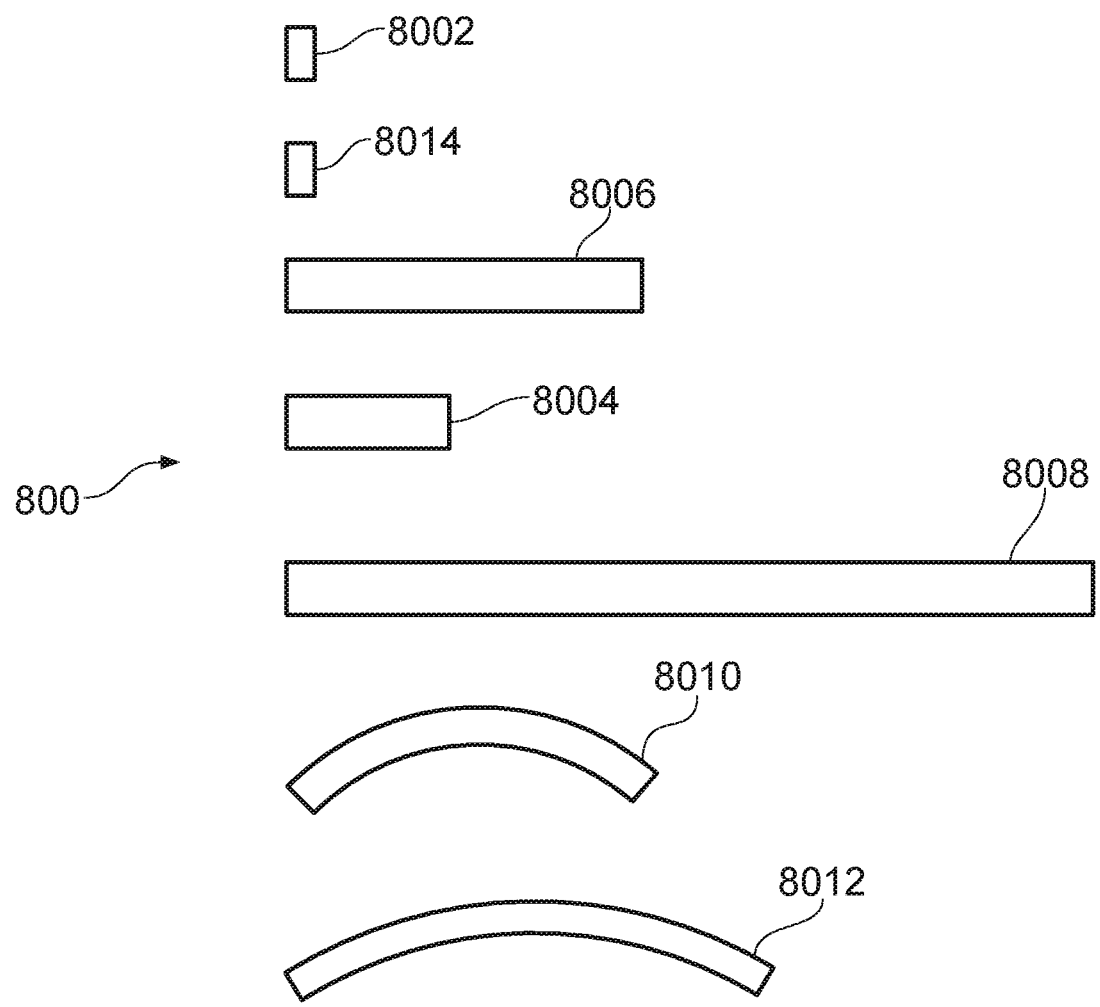
FIG. 8 illustrates an example of a set of stairlift rail components in accordance with embodiments of the disclosure.

Referring to FIG. 8 of the present embodiment, an example standard set of available stairlift rail components is illustrated.

In this example (illustrated with reference to FIG. 8) the set of stairlift component parts comprises a stairlift rail start section 8002, a series of straight stairlift rail components 8004 to 8008, a first curved stairlift component 8010, a second curved stairlift component 8012 and a stairlift end section 8014. Any number of these stairlift components may then be selected by apparatus 1000 in order to construct a kit of parts for the stairlift rail.

Regarding the series of straight stairlift rail components 8004 to 8008, it will be appreciated that these components may have varying lengths (as illustrated in FIG. 8). That is, in this specific example, the first straight stairlift component 8004 has a length of 10 cm, the second straight stairlift component 8006 has a length of 20 cm and the third straight stairlift component 8008 has a length of 100 cm.

It will further be appreciated that these stairlift components are designed in order that they may be interconnected as required. That is, an end of a first stairlift rail component may be connected to an end of any other stairlift rail component as required.

In some examples the set of stairlift component parts may also comprise parts such as the stairlift chair and motor, in addition to the stairlift rail components.

It will be appreciated that the set of stairlift rail component parts are not limited to those components illustrated in the example of FIG. 8 of the present disclosure. Rather, these component parts will vary in accordance with the standard stairlift component parts which are constructed by the stairlift supplier. However, it will be appreciated that the set of components will comprise a range of components of different rail lengths and shapes such that those components can be assembled in a manner such as to fit a wide range of staircases (as discussed in EP 3024770 B1).

Figure 9:
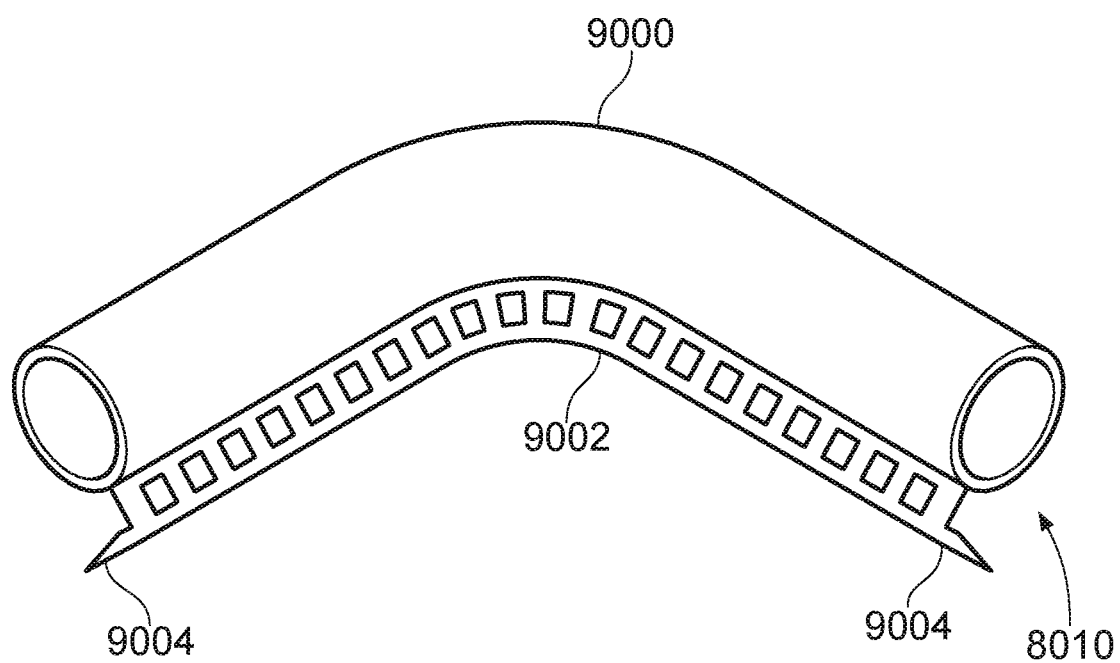
FIG. 9 illustrates an enlarged view of a stairlift rail component in accordance with embodiments of the disclosure.

Referring now to FIG. 9, a magnified view of the example first curved stairlift component 8010 is shown. That is, FIG. 9 shows an expanded or enlarged view of an example stairlift component which forms part of the predetermined (or standard) set of stairlift components 8000.

The example curved stairlift component 8010 as illustrated in FIG. 9 comprises a tubular shaft 9000 (along which the stairlift chair rides) and a rack 9002 extending along the length below the shaft 9000 to engage with drive cogs located on the chair. Engaging means 9004 are provided on both ends of the stairlift component (that is, on the distal ends of the rack 9002). These engaging means are adapted to engage with corresponding engaging means on an adjacent length of stairlift rail.

However, it will be appreciated that this is one example of a stairlift rail component which may be used in accordance with embodiments of the disclosure. The set of stairlift components may be defined by a plurality of individual stairlift rail components of differing length and differing shape to that illustrated as required.

In some examples apparatus 1000 is configured store information regarding the standard set of stairlift rail components are available (that is, the range of stairlift components from which the kit of parts for the specific staircase which has been measured (such as staircase 2000) can be chosen). This may be stored in the storage unit 1004, for example. Alternatively, apparatus 1000 may be configured to connect to a server using connecting means such as the network connection 1008 and retrieve the information regarding the standard set of stairlift components as required. In examples, this may be subsequent to the acquisition of the measurement information and/or the generation of the model.

Apparatus 1000 is then configured to select, on the basis of the model of the staircase which has been generated, a plurality of stairlift rail components from the predetermined standard set of stairlift rail components (such as the set 8000) a plurality of stairlift rail components as a kit of parts for the staircase. This kit of parts is the kit which can then be constructed into a stairlift rail which will fit the staircase which has been measured.

That is, apparatus 1000 is configured to compare the model of the staircase with the predetermined standard set of stairlift rail components and will then select certain elements which are required in order to construct a stairlift rail which will fit the staircase. It will be appreciated that multiple copies of the same element (such as two or more copies of the first curved stairlift component 8010) may be selected by apparatus 1000 as required.

There are a number of mechanisms by which the kit of parts for the stairlift rail may be selected from the predetermined set of stairlift components, and it will be appreciated that the claimed invention is not particularly limited in this regard. For example, a set of combinations and/or known arrangements of stairlift components may first be compared against the model which has been generated, and then, subsequently, this initial set of components may be adapted by the apparatus in order to fit the specific staircase.

In addition, in some examples, the type of staircase may be used in order to restrict the range of components which need be selected from. A straight staircase may not require certain types of curved stairlift components, for example.

Likewise, the physical dimensions of the staircase may also be used in order to restrict the range of components which need be selected from. A straight stairlift component with a length longer than that of the staircase can be automatically excluded from the kit of parts, for example.

In some examples, the apparatus 1000 may be configured to determine the kit of parts for the stairlift as a so-called 'unbounded knapsack problem' (UKP). This is a version of the 0-1 knapsack problem which removes the restriction that there is only one of each item. That is, the selection of the kit of parts may be governed by:

maximise $\Sigma_{i=1}^{n} v_i x_i$ (Equation 1)

subject to $\Sigma_{i=1}^{n} w_i x_i \leq W$ and $x_i \geq 0$ (Equation 2)

wherein n is a set of items, with a weight $w_i$ and a value $v_i$, and where W is a maximum weight capacity of the system.

In the specific example of selecting a stairlift rail for a staircase 2000 as described with reference to FIG. 2 of the present disclosure, the maximum weight capacity W represents the total required length of stairlift to fit the staircase (this value is determined from the model of the staircase which has been generated). The value of the item $V_i$ represents the inverse cost of each item (that is, a property related to the cost of construction of the individual stairlift rail components, such that the stairlift components which are cheaper to construct are optimally selected). Finally, weight $w_i$ represents the total length of each individual stairlift component. In this manner, the optimal kit of parts of stairlift components which fulfil the requirements of the stairlift rail for the staircase which has been selected can be determined.

It will further be appreciated that, in some situations, an additional constraint may be placed upon the stairlift rail which is determined by the apparatus 1000. This may be that the stairlift rail must start and end with the stairlift rail start section 8002 and the stairlift rail end section 8014, for example.

Figure 10:
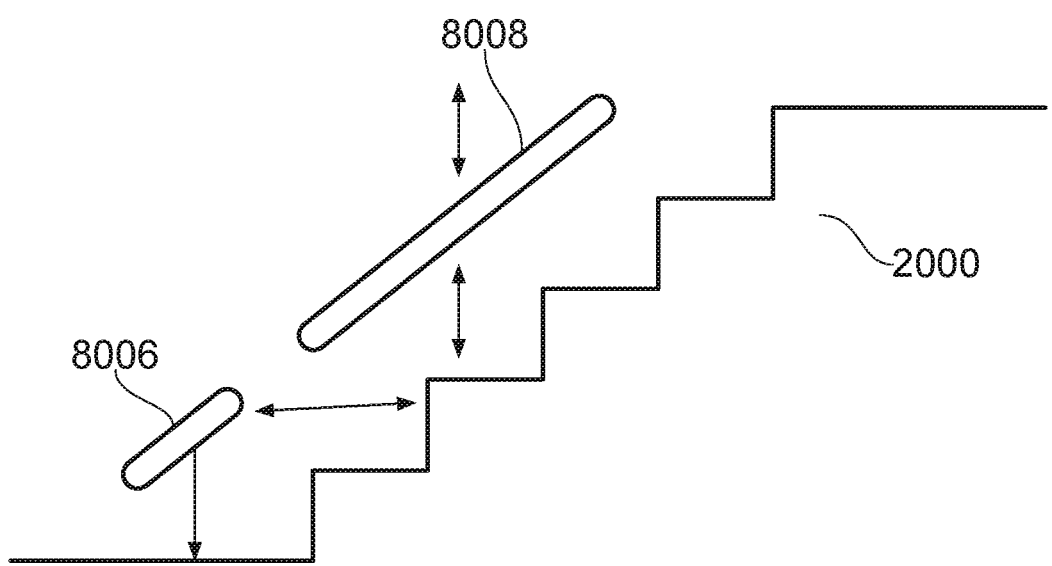
FIG. 10 illustrates an example of selecting a kit of parts in accordance with embodiments of the disclosure.

An example of the selection of the kit of parts for a staircase 2000 from the predetermined standard set of components 8000 is illustrated with reference to FIG. 10 of the present disclosure. That is, FIG. 10 illustrates an example of selecting a kit of parts in accordance with embodiments of the disclosure. As illustrated, apparatus 1000 is configured to select component parts which can be used to construct a kit of parts for the stairlift rail. That is, FIG. 10 provides a graphical representation of the process performed by apparatus 1000 when attempting to construct a specific kit of parts for staircase 2000, whereby various stairlift components are moved and arranged, individually or in combination, in order to construct a kit of parts.

In this specific example, the total length of the staircase 2000 is 4.5 metres (m). As described above, this is one such property of the staircase which is determined in accordance with the model which has been generated.

Now, in this specific example, apparatus 1000 determines that a curved stairlift component (being either the first curved component 8010 and 8012) is not required as the staircase 2000 is a straight staircase (again, this is determined in accordance with the model of the staircase which has been generated). Accordingly, the number of curved stairlift components 8010 and 8012 of the predetermined standard set of components 8000 which are required for the kit of parts can be set to zero.

In this example, apparatus 1000 also determines that a single stairlift rail start section 8002 and a single stairlift rail end section 8014 are required. It will be appreciated that, in this example, the length of the stairlift rail start section 8002 and the stairlift rail end section 8014 is negligible in comparison to the length of the staircase. Accordingly, the length of these components is not considered when determining the remaining components of the stairlift rail in this situation. However, in some examples, the stairlift rail start section 8002 and the stairlift rail end section 8014 may have non-negligible length in comparison to the length of the staircase. In this situation, the length of these components is subtracted from the length of rail which is required prior to the determination of the remaining components of kit of parts for the stairlift rail.

Next, apparatus 1000 can determine the stairlift rail components which are required to provide a stairlift rail between the stairlift rail start section 8002 and the stairlift rail end section 8014. In this example, the cost of the straight stairlift component 8008 is, per unit length, cheaper than the cost of the straight stairlift component 8006 which is, in turn, cheaper than the cost of the straight stairlift rail component 8004. This is because it is more efficient to provide a single consecutive length of stairlift rail (such as straight stairlift rail component 8008) than multiple individual stairlift rail components (such as straight stairlift rail component 8004) which cover the same distance.

Accordingly, on this basis, apparatus 1000 preferably chooses the straight stairlift rail component 8008. Four copies of this stair rail component are thus chosen taking the length of the stairlift rail to 4 metres (i.e. the total length of all the parts which have already been included in the kit of parts for the stairlift rail).

This leaves a remaining 0.5 metres of required stairlift rail.

In this example, apparatus 1000 subsequently determines that two copies of the straight stairlift component 8006 are required. This is because a further copy of stairlift rail 8008 (having a length of 100 cm or 1 metre) would not fit in the remaining 0.5 metre of required stairlift rail. In other words, straight stairlift rail 8008 is the longest individual stairlift component which fits in the remaining length of required stairlift rail.

The addition of two copies of component 8006 to the kit of parts leaves a remaining 0.1 metre of required stairlift rail in order to provide a complete kit of parts as a stairlift rail for the staircase 2000.

Finally, apparatus 1000 determines that the remaining portion of the required stairlift rail can be provided by the straight stairlift rail component 8004 (having a length of 10 cm). This is because neither the straight stairlift rail component 8006 (having a length of 20 cm) nor the straight stairlift rail component fit inside the remaining portion of the required stairlift rail.

As such, in this example, apparatus 1000 selects a kit of parts comprising a single copy of stairlift rail start section 8002, four copies of the straight stairlift rail component 8008, two copies of the straight stairlift rail component 8006, a single copy straight stairlift rail component 8004 and a single copy of stairlift rail end section 8014 as a kit of parts for a stairlift rail for staircase 2000.

In some examples, apparatus 1000 is configured to further determine that additional components (such as a chair) are also required in addition to the stairlift rail. These additional components are then also added to the kit of parts.

In some examples, a model of the stairlift rail (comprising three-dimensional images of the stairlift rail) may be generated by the apparatus in accordance with the kit of parts which has been selected. This model can then be overlaid on an image of the staircase in order to allow a user to visualize the staircase prior to its purchase and/or installation.

Furthermore, in some examples, once the kit of parts has been determined, the user of apparatus 1000 may be directed, either on apparatus 1000 or an alternative electronic device, to an order form and/or payment screen which enables the user to place an order to the requisite kit of parts with the supplier of the stairlift. This may be transmitted to a server operated by the supplier of the staircase from apparatus 1000 using network connection 1008, for example.

The kit of parts for the staircase may then, upon payment, be delivered to the location of the staircase 2000 and installed by a professional stairlift installer as required.

As such, according to embodiments of the disclosure, a person (such as a home owner who wishes a stairlift to be installed in their home) may perform a number of measurements of the physical dimensions of the staircase which enables apparatus 1000 to subsequently select a plurality of stairlift components as a kit of parts for a stairlift rail. Information regarding the kit of parts may then be passed to the supplier of the stairlift along with a request for installation. The supplier of the stairlift may then perform a single dispatch of the kit of parts to the person's home, such that those parts may be installed on the staircase as a stairlift. Embodiments of the disclosure therefore reduce the time and costs associated with the installation of a stairlift to a staircase.

Figure 11:
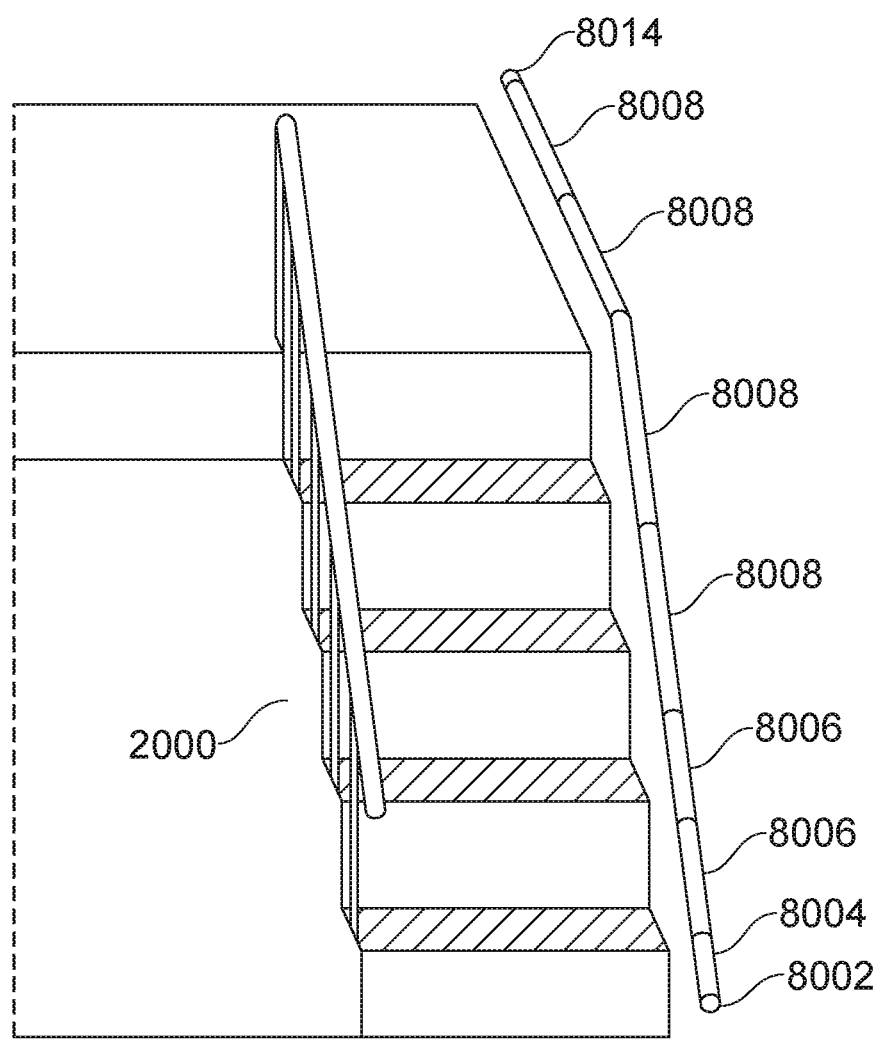
FIG. 11 illustrates an example of a kit of parts selected for a staircase in accordance with embodiments of the disclosure.

An example of the stairlift rail 1100 installed on the staircase 2000 on the basis of the kit of parts which has been selected by apparatus 1000 is illustrated with reference to FIG. 11 of the present disclosure. That is, FIG. 11 illustrates an example of a kit of parts for the staircase 2000 in accordance with embodiments of the disclosure.

Of course, it will be appreciated that while the selection of the kit of parts for the staircase by apparatus 1000 has been illustrated with reference to the example staircase 2000, the present disclosure is not intended to be particularly limited in this respect. Rather, the teachings of the present disclosure may be applied to any such staircase as required. That is, the present embodiment can be applied to a staircase other than the type illustrated with reference to FIG. 2 of the present disclosure. Likewise, the number of steps (and their relative size or orientation) is also not limited to the number illustrated in FIG. 2.

As will be appreciated, the selection of the kit is relevant for some embodiments and not others as will be apparent from the claims.

Method

Figure 12:
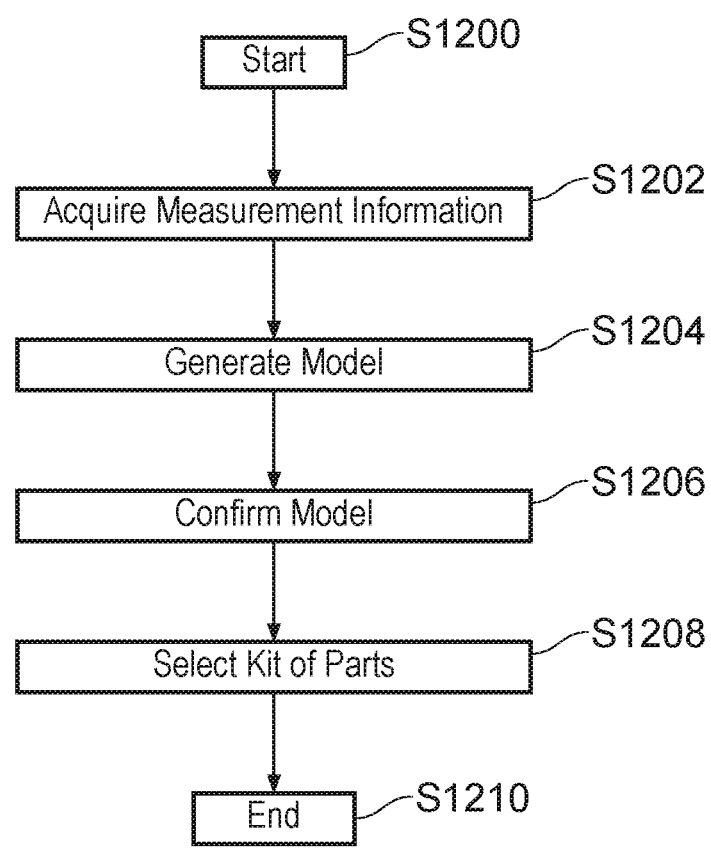
FIG. 12 illustrates a method of selecting a plurality of stairlift components in accordance with embodiments of the disclosure.

Hence, more generally, a method of selecting a plurality of stairlift components as a kit of parts for a stairlift rail is provided. FIG. 12 illustrates the method of selecting a plurality of stairlift components in accordance with embodiments of the disclosure.

The method starts in step S1200 and proceeds to step S1202.

In step S1202, the method comprises acquiring measurement information indicative of one or more physical dimensions of a staircase. This may be acquired through wired or wireless communication with a measuring device (such as the laser measurement device described with reference to FIG. 4 of the present disclosure) or, alternatively, may be acquired directly by apparatus 1000 from one or more images of the staircase.

Once the measurement information has been acquired, the method proceeds to step S1204.

In step S1204, the method comprises generating a model of the staircase in accordance with the measurement information. In examples, the model may comprise a three-dimensional model of the staircase. Alternatively, a series of two-dimensional models of the staircase may be generated in accordance with embodiments of the present disclosure.

Once the model of the staircase has been generated, the method proceeds to step S1206.

In step S1206, the method comprises, confirming (or verifying) the model by overlaying the model upon the staircase. Confirmation may comprise a computation of the differential between the model of the staircase and a verification image of the staircase. In examples, this may be performed internally by an apparatus, such as apparatus 1000, without presentation of that model to a user. Confirmation may be provided when the differentials between the model and the verification image of the staircase are below a predetermined threshold limit, for example.

Once the model has been confirmed, the method proceeds to step S1208.

In step S1208, the method comprises selecting, on the basis of the model, a plurality of stairlift rail components, from a predetermined set of stairlift rail components, as a kit of parts for the stairlift rail. In examples, this may be performed in accordance with one or more of: the type of the staircase (determined from the model); known constrains of a stairlift rail; and/or an optimization of the number of individual stairlift components (and/or the cost of the stairlift rail).

The method then proceeds to, and ends with, step S1210.

Although the foregoing has been explained with reference to installation of a stairlift upon a staircase, as noted above, the disclosure is not so limited and the disclosure may be applied more generally to the selection of a plurality of components as a kit of parts that traverse an incline. The components may be a stairlift rail or may be a ramp component and the incline may be stairs, a staircase, a slope or the like that are either indoors or outdoors.

Figure 13:
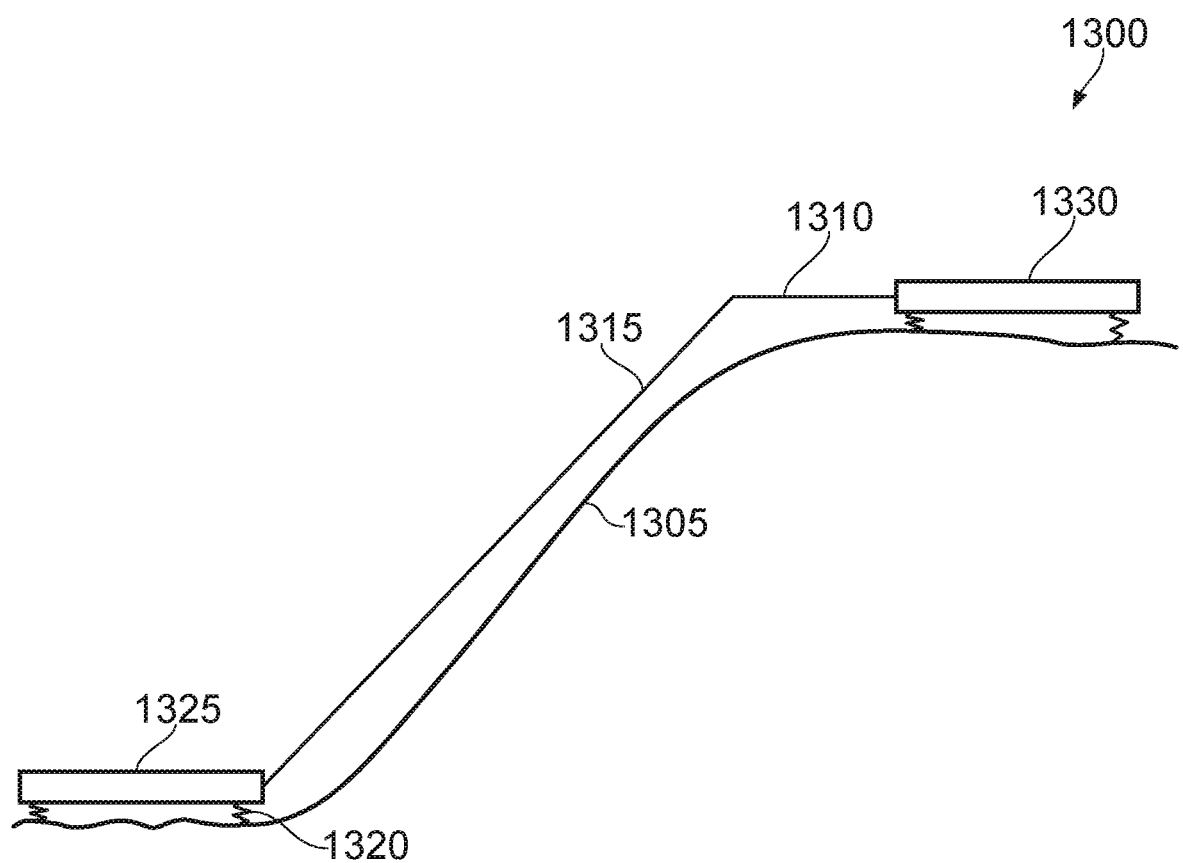
FIG. 13 illustrates an example of a kit of components being selected to traverse an incline.

FIG. 13 shows an installation 1300 on an outdoor slope 1305. The installation 1300 has a first platform 1325 on a lower surface of the slope and a second platform 1330 on an upper surface of the slope 1305. The first platform 1325 and the second platform 1330 are, in embodiments, held in position using ground screws. A ground screw 1320 is a known device that is used to affix items to soft ground. The ground screw is inserted into the ground and the platform is affixed to the top of the screw and held in position; the ground screw thus acting as a foundation to the platform. Of course, although the use of a ground screw is envisaged, the disclosure is not so limited. The platform may be mounted on a concrete foundation or pad or the ground screw may be encased in concrete or the like.

Moreover, although the construction of a first and second platform is envisaged, the disclosure is not so limited and the function of the first and/or second platform may be provided by a component in the kit of parts.

In this embodiment, the method of selecting a kit of components is as described in respect of the stairlift embodiment. However, as would be appreciated, the method in this case would capture the distance and inclination between the first and second platform instead of the physical dimensions of the staircase. The components would then be selected and modeled as described above in respect of the stairlift component kit of parts. In this example, a long ramp component 1315 and a short ramp component 1310 are selected and modeled. It should be also appreciated that, in the case of a ramp, the incline of the ramp may be included as a constraint on the number and configuration of the components. For example, when traversing a steep incline, the number and configuration of components may be selected so that the incline on any one component does not exceed a threshold amount, such as not exceeding an incline of 1 in 15. This ensures that local Building Regulations can be adhered to and a suitable ramp may be constructed.

The construction of the ramp or stairlift on the inclination can then be achieved.

Although not specifically shown in FIG. 13, if the component kit of parts is for a powered device such as a stairlift or a powered ramp that assists the propulsion of a wheelchair up a ramp, electrical power may be provided to the ramp or stairlift as required. This may be achieved using a power supply from a dwelling or may be provided by one or more solar panels. The position of the solar panel (and any housing for the requisite electrical connections) may be included in the augmented reality model generated according to embodiments of the disclosure.

Figure 14:
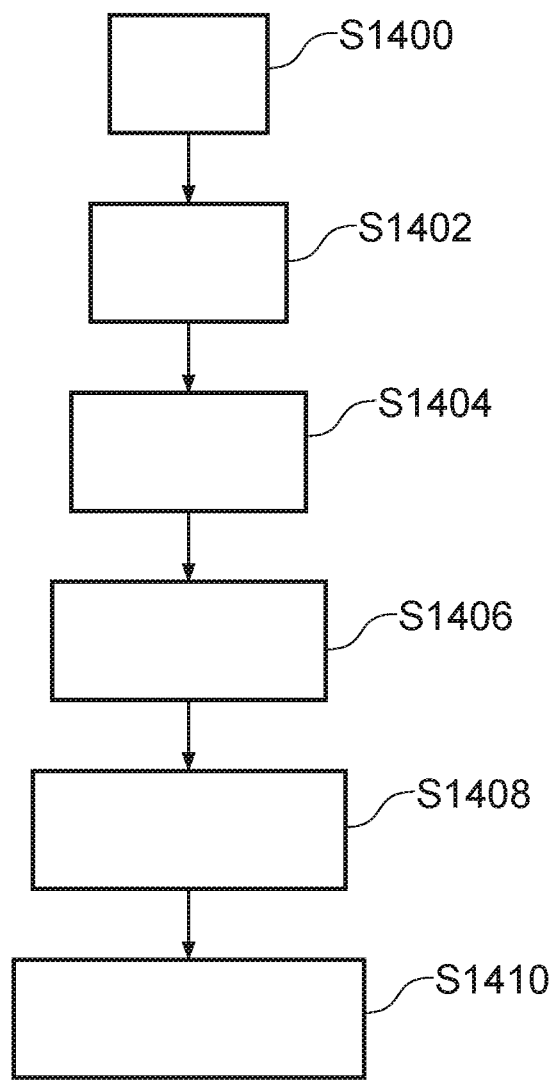
FIG. 14 illustrates a method of selecting a plurality of components for traversing an incline in accordance with embodiments of the disclosure.

FIG. 14 illustrates a method of selecting a plurality of components for traversing an incline in accordance with embodiments of the disclosure.

The method starts in step S1400 and proceeds to step S1402.

In step S1402, the method comprises acquiring measurement information indicative of one or more physical dimensions of an incline. This may be acquired through wired or wireless communication with a measuring device (such as the laser measurement device described with reference to FIG. 4 of the present disclosure) or, alternatively, may be acquired directly by apparatus 1000 from one or more images of the incline.

Once the measurement information has been acquired, the method proceeds to step S1404.

In step S1404, the method comprises generating a model of the incline in accordance with the measurement information. In examples, the model may comprise a three-dimensional model of the incline. Alternatively, a series of two-dimensional models of the incline may be generated in accordance with embodiments of the present disclosure.

Once the model of the incline has been generated, the method proceeds to step S1406.

In step S1406, the method comprises, confirming (or verifying) the model by overlaying the model upon the incline. Confirmation may comprise a computation of the differential between the model of the incline and a verification image of the incline. In examples, this may be performed internally by an apparatus, such as apparatus 1000, without presentation of that model to a user. Confirmation may be provided when the differentials between the model and the verification image of the incline are below a predetermined threshold limit, for example.

Once the model has been confirmed, the method proceeds to step S1408.

In step S1408, the method comprises selecting, on the basis of the model, a plurality of components, from a predetermined set of components, as a kit of parts for traversing the incline. In examples relating to the incline being a staircase, this may be performed in accordance with one or more of: the type of the staircase (determined from the model); known constrains of a stairlift rail; and/or an optimization of the number of individual stairlift components (and/or the cost of the stairlift rail). In addition, the gradient (or inclination angle) of the component may be a constraint. As will be appreciated, the disclosure is not so limited in response of step S1408. Instead of selecting the plurality of components, the disclosure may display, on the basis of the model, a plurality of components, from a predetermined set of components, as a kit of parts that traverse the incline. This will allow a user to visually survey an incline and see the components as a kit of parts that traverse the incline.

The method then proceeds to, and ends with, step S1410.

In addition, technical features and aspects of the present disclosure may further be arranged in accordance with the following numbered Clauses:

1. A method of selecting a plurality of stairlift components as a kit of parts for a stairlift rail, the method comprising:
   acquiring measurement information indicative of one or more physical dimensions of a staircase;
   generating a model of the staircase in accordance with the measurement information;
   confirming the model by overlaying the model upon the staircase;
   and selecting, on the basis of the model, a plurality of stairlift rail components, from a predetermined set of stairlift rail components, as a kit of parts for the stairlift rail.
2. The method according to Clause 1, further comprising adjusting one or more parameters of the model in accordance with a result of confirming the model.
3. The method according to any preceding Clause, wherein the one or more physical dimensions of the staircase comprise at least one of: the number of steps in the staircase; the height of a step of the staircase; the width of a step of the staircase; the depth of a step of the staircase; and/or the relative orientation of the steps of the staircase.
4. The method according to any preceding Clause, wherein acquiring measurement information comprises at least one of: receiving a user input instruction indicative of the measurement information and acquiring the measurement information from the user instruction; receiving a transmission indicative of the measurement information from a measuring device and acquiring the measurement information from the transmission; and/or receiving an image or set of images of the staircase and acquiring the measurement information from the set of images.
5. The method according to any preceding Clause, wherein overlaying the model comprises overlaying an image of the staircase with an image of the model.
6. The method according to Clause 5, wherein the method further comprises displaying the overlaid image of the staircase on a display screen.
7. The method according to any preceding Clause, wherein the method comprises overlaying a model of the kit of parts of the stairlift rail, assembled into a stairlift rail, with the model and/or the staircase.
8. An apparatus for selecting a plurality of stairlift components as a kit of parts for a stairlift rail, the apparatus comprising processing circuitry configured to:
   acquire measurement information indicative of one or more physical dimensions of a staircase;
   generate a model of the staircase in accordance with the measurement information;
   confirm the model by overlaying the model upon the staircase;
   and select, on the basis of the model, a plurality of stairlift rail components, from a predetermined set of stairlift rail components, as a kit of parts for the stairlift rail.
9. A computer program product comprising instructions which, when the program is executed by the computer, cause the computer to carry out a method of selecting a plurality of stairlift components as a kit of parts for a stairlift rail, the method comprising:
   acquiring measurement information indicative of one or more physical dimensions of a staircase;

generating a model of the staircase in accordance with the measurement information;
confirming the model by overlaying the model upon the staircase;
and selecting, on the basis of the model, a plurality of stairlift rail components, from a predetermined set of stairlift rail components, as a kit of parts for the stairlift rail.

10) A method of selecting a plurality of components as a kit of parts that traverse an incline, the method comprising:
acquiring measurement information indicative of one or more physical dimensions of the incline;
generating a model of the incline in accordance with the measurement information;
confirming the model by overlaying the model upon the incline;
and selecting, on the basis of the model, a plurality of components, from a predetermined set of components, as a kit of parts for traversing the incline.

11) The method according to Clause 10, further comprising adjusting one or more parameters of the model in accordance with a result of confirming the model.

12) The method according to Clause 10, wherein acquiring measurement information comprises at least one of: receiving a user input instruction indicative of the measurement information and acquiring the measurement information from the user instruction; receiving a transmission indicative of the measurement information from a measuring device and acquiring the measurement information from the transmission; and/or receiving an image or set of images of the incline and acquiring the measurement information from the set of images.

13) The method according to Clause 10, wherein overlaying the model comprises overlaying an image of the incline with an image of the model.

14) The method according to Clause 13, wherein the method further comprises displaying the overlaid image of the incline on a display screen.

15) A method of displaying a plurality of components that traverse an incline, the method comprising:
acquiring measurement information indicative of one or more physical dimensions of the incline;
generating a model of the incline in accordance with the measurement information;
confirming the model by overlaying the model upon the incline;
and displaying, on the basis of the model, a plurality of components, from a predetermined set of components, that traverse the incline.

16) An apparatus for selecting a plurality of components to traverse an incline, the apparatus comprising processing circuitry configured to:
acquire measurement information indicative of one or more physical dimensions of the incline;
generate a model of the incline in accordance with the measurement information;
confirm the model by overlaying the model upon the incline;
and select, on the basis of the model, a plurality of components, for traversing the incline.

17) An apparatus for displaying a plurality of components that traverse an incline, the apparatus comprising processing circuitry configured to:
acquire measurement information indicative of one or more physical dimensions of the incline;
generate a model of the incline in accordance with the measurement information;
confirm the model by overlaying the model upon the incline;
and display, on the basis of the model, a plurality of components that traverse the incline.

18) A computer program product comprising instructions which, when the program is executed by the computer, cause the computer to carry out a method according to any one of clauses 10 to 15.

19) An apparatus for selecting a plurality of components as a kit of parts to traverse an incline, the apparatus comprising processing circuitry configured to:
acquire measurement information indicative of one or more physical dimensions of the incline;
generate a model of the incline in accordance with the measurement information;
confirm the model by overlaying the model upon the incline;
and select, on the basis of the model, a plurality of components, from a predetermined set of components, as a kit of parts for traversing an incline.

20) A method of selecting a plurality of components as a kit of parts that traverse an incline, the method comprising:
acquiring measurement information indicative of one or more physical dimensions of the incline;
generating a model of the incline in accordance with the measurement information;
confirming the model by overlaying the model upon the incline;
and selecting, on the basis of the model, a plurality of components, from a predetermined set of components, as a kit of parts for traversing the incline.

Obviously, numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

The invention claimed is:

1. A method of selecting a plurality of components as a kit of parts that traverse an incline, the method comprising:
    acquiring, by a computing device, measurement information indicative of one or more physical dimensions of the incline;
    generating, by the computing device, a model of the incline in accordance with the measurement information, the model of the incline comprising a three-dimensional digital representation of the incline;
    rendering, by the computing device, a user interface comprising the model of the incline on a display device of the computing device;
    adjusting, by the computing device, one or more parameters of the model based at least in part on user interactions with the model on the display device, the one or more parameters comprising a height, a width, or a depth of at least one step of the incline;
    overlaying, by the computing device, the adjusted model of the incline upon an image of the incline;
    determining, by the computing device, an amount of offset between the overlaid model of the incline and the image of the incline;
    fine tuning the overlaid model by randomly fluctuating, by the computing device, the one or more parameters of the overlaid model, wherein the fine tuning reduces the amount of the offset between the image of the incline and the overlaid model and the fine tuning determines an optimal fit between the image of the incline and the overlaid model;
    confirming the overlaid model represents an accurate representation of the incline based on the fine tuning of the overlaid model, wherein confirming the overlaid model comprises confirming the amount of the offset is below a predefined threshold; and
    selecting, by the computing device, on a basis of the confirmed model, a plurality of components, from a predetermined set of components, as a kit of parts for traversing the incline.

2. The method according to claim 1, wherein acquiring measurement information comprises at least one of:
    receiving a user input instruction indicative of the measurement information and acquiring the measurement information from the user input instruction;
    receiving a transmission indicative of the measurement information from a measuring device and acquiring the measurement information from the transmission; and/or
    receiving an image or set of images of the incline and acquiring the measurement information from the set of images.

3. The method according to claim 2, wherein the incline being traversed is a staircase and the components are standard components of a stairlift rail.

4. The method according to claim 1, wherein the method further comprises displaying the overlaid model of the incline upon the image of the incline on the display device.

5. The method according to claim 4, wherein the incline being traversed is a staircase and the components are standard components of a stairlift rail.

6. The method according to claim 1, wherein the incline being traversed is a staircase and the components are standard components of a stairlift rail.

7. The method according to claim 6, wherein the one or more physical dimensions of the incline comprise at least one of: a number of steps in the staircase; a height of a step of the staircase; a width of a step of the staircase; a depth of a step of the staircase; and/or a relative orientation of the steps of the staircase.

8. The method of claim 1, further comprising determining the amount of offset between the overlaid model of the incline and the image of the incline by calculating residuals between the overlaid model and the image of the incline at a number of discrete points across the incline.

9. An apparatus for selecting a plurality of components as a kit of parts to traverse an incline, the apparatus comprising:
    a computing device comprising a processor and a memory; and
    computer instructions stored in the memory that, when executed by the processor, cause the computing device to at least:
        acquire measurement information indicative of one or more physical dimensions of the incline;
        generate a model of the incline in accordance with the measurement information, the model of the incline comprising a three-dimensional digital representation of the incline;
        rendering the model of the incline on a display device of the computing device;
        adjust one or more parameters of the model based at least in part on user interactions with the model on the display device, the one or more parameters comprising a height, a width, or a depth of at least one step of the incline;
        overlay the adjusted model of the incline upon an image of the incline;
        determine an amount of offset between the image of the incline and the overlaid model;
        fine tune the overlaid model by randomly fluctuating the one or more parameters of the overlaid model, wherein the fine tuning reduces the amount of the offset between the image of the incline and the overlaid model and the fine tuning determines an optimal fit between the image of the incline and the overlaid model;
        confirm the overlaid model represents an accurate representation of the incline based on the fine tuning of the overlaid model, wherein confirming the overlaid model comprises confirming the amount of the offset is below a predefined threshold; and
        select, on a basis of the confirmed model, a plurality of components, from a predetermined set of components, as a kit of parts for traversing an incline.

10. An apparatus according to claim 9, wherein the incline being traversed is a staircase and the components are standard components of a stairlift rail.

11. An apparatus according to claim 9, further comprising a measuring device in data communication with the computing device, the measuring device being configured to measure the one or more physical dimensions of the incline, the measurement information being acquired from the measuring device via the data communication.

12. The apparatus of claim 9, wherein, when executed, the computer instructions further cause the computing device to at least determine the amount of offset between the overlaid model of the incline and the image of the incline by calculating residuals between the overlaid model and the image of the incline at a number of discrete points across the incline.

13. A non-transitory, computer-readable medium comprising machine-readable instructions that, when executed by a computer, cause the computer to:
acquire measurement information indicative of one or more physical dimensions of an incline;
generate a model of the incline in accordance with the measurement information, the model of the incline comprising a three-dimensional digital representation of the incline;
rendering the model of the incline on a display device of the computing device;
adjust one or more parameters of the model based at least in part on user interactions with the model on the display device, the one or more parameters comprising a height, a width, or a depth of at least one step of the incline;
overlay the adjusted model of the incline upon an image of the incline;
determine an amount of offset between the image of the incline and the overlaid model;
fine tune the overlaid model by randomly fluctuating the one or more parameters of the overlaid model, wherein the fine tuning reduces the amount of the offset between the image of the incline and the overlaid model and the fine tuning determines an optimal fit between the image of the incline and the overlaid model;
confirm the overlaid model represents an accurate representation of the incline based on the fine tuning of the overlaid model, wherein confirming the overlaid model comprises confirming the amount of the offset is below a predefined threshold; and
select, on a basis of the confirmed model, a plurality of components, from a predetermined set of components, as a kit of parts for traversing an incline.

14. A non-transitory, computer-readable medium embodying a computer program comprising instructions executable in a computer which, when the program is executed by the computer, cause the computer to:
acquire measurement information indicative of one or more physical dimensions of an incline, wherein acquiring measurement information comprises at least one of: receiving a user input instruction indicative of the measurement information and acquiring the measurement information from the user input instruction; receiving a transmission indicative of the measurement information from a measuring device and acquiring the measurement information from the transmission; and/or receiving an image or set of images of the incline and acquiring the measurement information from the set of images;
generate a model of the incline in accordance with the measurement information, the model of the incline comprising a three-dimensional digital representation of the incline;
rendering the model of the incline on a display device of the computing device;
adjust one or more parameters of the model based at least in part on user interactions with the model on the display device, the one or more parameters comprising a height, a width, or a depth of at least one step of the incline;
overlay the adjusted model of the incline upon an image of the incline;
determine an amount of offset between the image of the incline and the overlaid model;
fine tune the overlaid model by randomly fluctuating the one or more parameters of the overlaid model, wherein the fine tuning reduces the amount of the offset between the image of the incline and the overlaid model and the fine tuning determines an optimal fit between the image of the incline and the overlaid model;
confirm the overlaid model represents an accurate representation of the incline based on the fine tuning of the overlaid model, wherein confirming the overlaid model comprises confirming the amount of the offset is below a predefined threshold; and
select, on a basis of the confirmed model, a plurality of components, from a predetermined set of components, as a kit of parts for traversing an incline.

15. A non-transitory computer-readable medium embodying a computer program comprising instructions executable in a computer which, when the program is executed by the computer, cause the computer to:
acquire measurement information indicative of one or more physical dimensions of an incline;
generate a model of the incline in accordance with the measurement information, the model of the incline comprising a three-dimensional digital representation of the incline;
rendering the model of the incline on a display device of the computing device;
adjust one or more parameters of the model based at least in part on user interactions with the model on the display device, the one or more parameters comprising a height, a width, or a depth of at least one step of the incline;
overlay the adjusted model of the incline upon an image of the incline;
determine an amount of offset between the image of the incline and the overlaid model;
fine tune the overlaid model by randomly fluctuating the one or more parameters of the overlaid model, wherein the fine tuning reduces the amount of the offset between the image of the incline and the overlaid model and the fine tuning determines an optimal fit between the image of the incline and the overlaid model;
confirm the overlaid model represents an accurate representation of the incline based on the fine tuning of the overlaid model, wherein confirming the overlaid model comprises confirming the amount of the offset is below a predefined threshold; and
select, on a basis of the confirmed model, a plurality of components, from a predetermined set of components, as a kit of parts for traversing an incline;
display the overlaid model of the incline upon the image of the incline on the display device.

16. A non-transitory, computer-readable medium embodying a computer program product comprising instructions executable in a computer which, when the program is executed by the computer, cause the computer to:
acquire measurement information indicative of one or more physical dimensions of an incline, wherein the incline being traversed is a staircase and the components are standard components of a stairlift rail;
generate a model of the incline in accordance with the measurement information, the model of the incline comprising a three-dimensional digital representation of the incline;
rendering the model of the incline on a display device of the computing device;

adjust one or more parameters of the model based at least in part on user interactions with the model on the display device, the one or more parameters comprising a height, a width, or a depth of at least one step of the incline;

overlay the adjusted model of the incline upon an image of the incline;

determine an amount of offset between the image of the incline and the overlaid model;

fine tune the overlaid model by randomly fluctuating the one or more parameters of the overlaid model, wherein the fine tuning reduces the amount of the offset between the image of the incline and the overlaid model and the fine tuning determines an optimal fit between the image of the incline and the overlaid model;

confirm the overlaid model represents an accurate representation of the incline based on the fine tuning of the overlaid model, wherein confirming the overlaid model comprises confirming the amount of the offset is below a predefined threshold; and select, on a basis of the confirmed model, a plurality of components, from a predetermined set of components, as a kit of parts for traversing an incline.

17. A non-transitory, computer-readable medium embodying a computer program product comprising instructions executable in a computer which, when the program is executed by the computer, cause the computer to:

acquire measurement information indicative of one or more physical dimensions of an incline, wherein the incline being traversed is a staircase and the components are standard components of a stairlift rail, and wherein the one or more physical dimensions of the staircase comprise at least one of: a number of steps in the staircase; a height of a step of the staircase; a width of a step of the staircase; a depth of a step of the staircase; and/or a relative orientation of the steps of the staircase;

generate a model of the incline in accordance with the measurement information, the model of the incline comprising a three-dimensional digital representation of the incline;

rendering the model of the incline on a display device of the computing device;

adjust one or more parameters of the model based at least in part on user interactions with the model on the display device, the one or more parameters comprising a height, a width, or a depth of at least one step of the incline;

overlay the adjusted model of the incline upon an image of the incline;

determine an amount of offset between the image of the incline and the overlaid model;

fine tune the overlaid model by randomly fluctuating the one or more parameters of the overlaid model, wherein the fine tuning reduces the amount of the offset between the image of the incline and the overlaid model and the fine tuning determines an optimal fit between the image of the incline and the overlaid model;

confirm the overlaid model represents an accurate representation of the incline based on the fine tuning of the overlaid model, wherein confirming the overlaid model comprises confirming the amount of the offset is below a predefined threshold; and select, on a basis of the confirmed model, a plurality of components, from a predetermined set of components, as a kit of parts for traversing an incline.

* * * * *